United States Patent
Rochel

(10) Patent No.: US 7,070,237 B2
(45) Date of Patent: Jul. 4, 2006

(54) UNIVERSAL VEHICLE HEADREST MONITOR SUPPORTING BRACKET ASSEMBLY

(75) Inventor: Sohail Rochel, Los Angeles, CA (US)

(73) Assignee: Epsilon Electronics, Inc., Commerce, CA (US)

( * ) Notice: Subject to any disclaimer, the term of this patent is extended or adjusted under 35 U.S.C. 154(b) by 595 days.

(21) Appl. No.: 10/216,908

(22) Filed: Aug. 13, 2002

(65) Prior Publication Data
US 2004/0032541 A1 Feb. 19, 2004

(51) Int. Cl.
*A47C 31/00* (2006.01)

(52) U.S. Cl. .............................. 297/217.3; 297/217.4; 297/391; 297/408; 248/118

(58) Field of Classification Search ............ 297/217.3, 297/217.4, 391, 408, 298.1, 125.1; 725/74–75, 725/81, 77; 307/10.1; 348/837, 61, 825, 348/739; 248/118, 121
See application file for complete search history.

(56) References Cited

U.S. PATENT DOCUMENTS

| | | | | |
|---|---|---|---|---|
| 3,946,977 A * | 3/1976 | Kuhfus | .................. | 379/435 |
| 4,639,041 A * | 1/1987 | Furukawa | .................. | 297/391 |
| 4,991,907 A * | 2/1991 | Tanaka | .................. | 297/408 |
| 5,474,357 A * | 12/1995 | Dukatz et al. | .................. | 297/238 |
| 6,021,535 A * | 2/2000 | Baus et al. | .................. | 5/632 |
| 6,199,900 B1 * | 3/2001 | Zeigler | .................. | 280/735 |
| 6,231,017 B1 * | 5/2001 | Watkins | .................. | 248/274.1 |
| 6,394,551 B1 * | 5/2002 | Beukema | .................. | 297/391 |
| 6,698,832 B1 * | 3/2004 | Boudinot | .................. | 297/217.4 |
| 6,883,870 B1 * | 4/2005 | Jost | .................. | 297/391 |

OTHER PUBLICATIONS

U.S. Appl. No. 10/281,282, filed Oct. 28, 2002, Norvell et al.

* cited by examiner

*Primary Examiner*—Peter M. Cuomo
*Assistant Examiner*—Erika Garrett
(74) *Attorney, Agent, or Firm*—Jacobson Holman PLLC

(57) ABSTRACT

A universal headrest mounting collar which is engaged with the rods of a headrest on a vehicle seat back and supports a video monitor thereon for viewing by a passenger in a rear seat. The bracket can be secured at a fixed vertical position on the headrest rods and collar assemblies surrounding the rods are horizontally slidable in grooves formed in the base of the bracket assembly to accommodate different spacing between headrest rods by different vehicle manufacturers. The monitor mounting element is universally adjustable to modify the viewing angle of the monitor screen.

13 Claims, 6 Drawing Sheets

UNIVERSAL VEHICLE HEADREST MONITOR SUPPORTING BRACKET ASSEMBLY

BACKGROUND OF THE INVENTION

1. Field of the Invention

This invention relates to video monitors for vehicles such as automobiles and the like and relates more particularly to supporting means for such monitors.

2. Description of the Related Prior Art

More frequently vehicles are being designed to accommodate video monitors, such as TFT LCD screens and the like designed to enable passengers to watch television programs, prerecorded tapes or DVDs, or to play video games, or even to access the Internet during a trip. Currently, such video monitors come in different sizes, 5", 5.6", 7", etc., and they may be mounted in the sun visor, the dash or on the ceiling, but most commonly are supported behind or in the rear of the headrest of the front seats to entertain or educate passengers seated in the rear seats.

Currently available supports for such video monitors are either factory-installed or difficult and expensive to incorporate as an after-market item.

Moreover, such video monitors are often fixed in position in the vehicle, and generally difficult or impossible to remove. Thus, they commonly remain with the vehicle when the driver and passengers leave the vehicle, making them attractive targets for theft.

SUMMARY OF THE INVENTION

It is a primary object of this invention to provide a bracket assembly which is easy to install in, and remove from, a vehicle and adapted to securely support a video monitor for viewing by passengers in the rear seats of the vehicle.

Another object of this invention is to provide a bracket assembly of the type described which can be temporarily or permanently mounted directly on the rods supporting the headrests on the front seats of a vehicle.

A further object of this invention is the provision of a video monitor-supporting bracket assembly which is vertically positionable at a desired height on the headrest rods, easily adjusted to accommodate different spacing between the rods of headrests in different vehicles and, also, easily adjusted for secure attachment to headrest rods of different diameter.

A still further object of this invention is to provide a bracket assembly designed to removably mount a video monitor to facilitate disengaging of the monitor from the bracket assembly for storage or use in a different location thereby minimizing theft and maximizing monitor utility.

Yet another object of this invention is to provide a bracket assembly for a video monitor in a vehicle which enables the position of the screen on the monitor to be universally adjusted in a simple manner to provide a desired viewing angle.

A still further object of the invention is to provide a bracket assembly for a video monitor to be used in a vehicle which is simple and inexpensive to manufacture, easily installed and removed, and highly versatile in use.

Other and further objects of this invention will be readily understood by those with ordinary skill in the art with particular reference to the following detailed description of the preferred embodiments in combination with the accompanying drawings.

BRIEF DESCRIPTION OF THE DRAWING

Like reference characters refer to like parts throughout the several views of the drawings.

DETAILED DESCRIPTION OF THE PREFERRED EMBODIMENTS

The foregoing descriptions and drawing should be considered as illustrative only of the principles of the invention. As noted, the invention may be configured in a variety of shapes and sizes and is not limited by the dimensions of the preferred embodiment. Numerous applications of the present invention will readily occur to those skilled in the art. Therefore, it is not desired to limit the invention to the preferred embodiments or the exact construction and operation shown and described. Rather, all suitable modifications and equivalents may be resorted to, falling within the scope of the invention.

Figure 1:
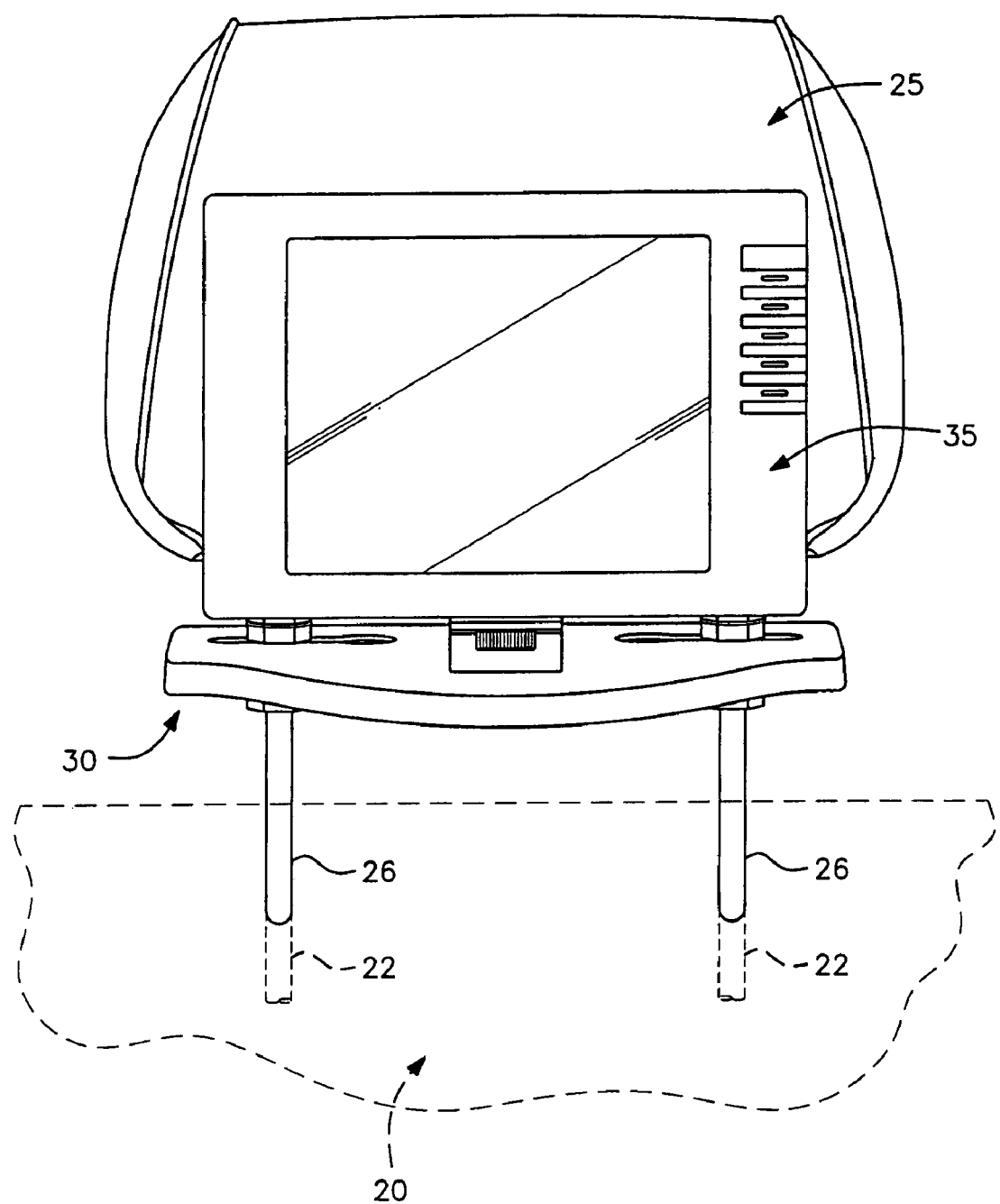
FIG. 1 is an elevational view of one embodiment of a bracket assembly according to this invention mounted on the rods of a vehicle seat headrest, with a portion of the seat back shown in dotted lines, and a vehicle monitor mounted on the bracket assembly.
Figure 2:
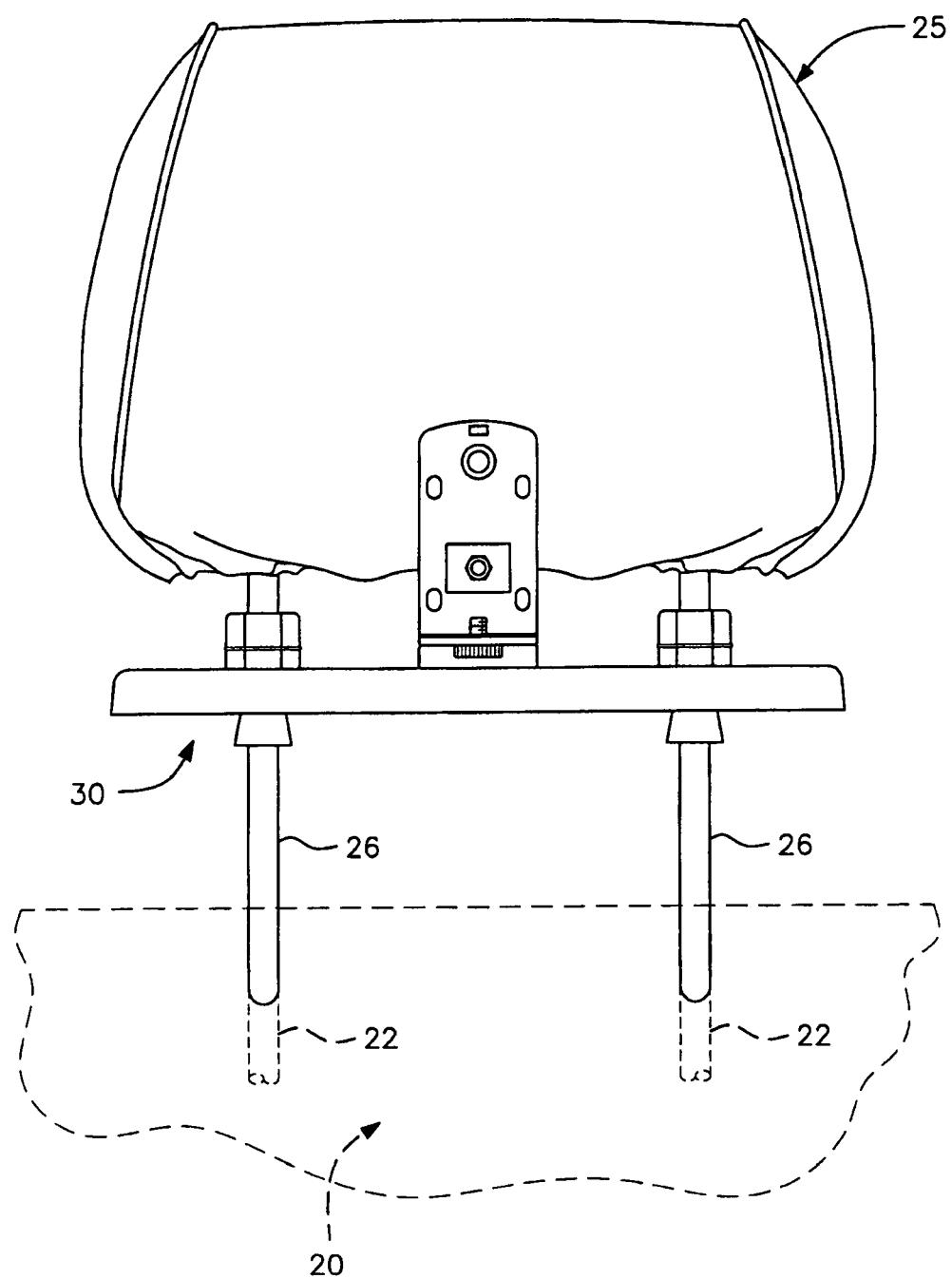
FIG. 2 is a view similar to FIG. 1 with the monitor removed.
Figure 3:
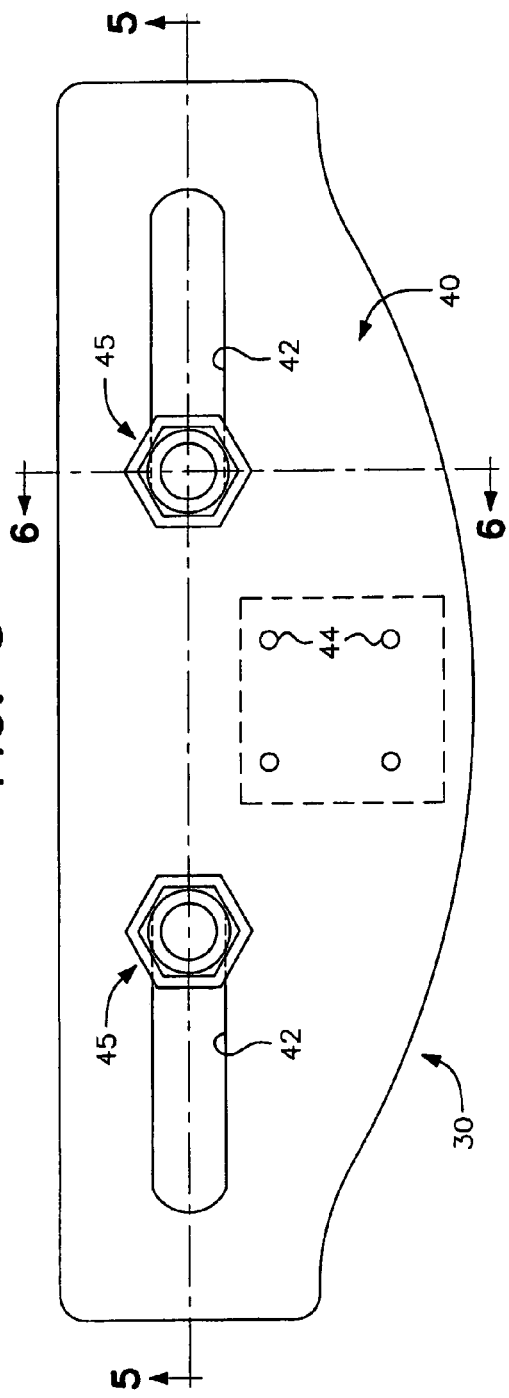
FIG. 3 is a top plan view of the bracket assembly base member with a pair of collar assemblies carried thereby for engaging the rod members of a seat headrest, the location for attachment of the universally adjustable monitor mounting element being shown in dotted lines.
Figure 4:
FIG. 4 is a front elevational view of the base member of FIG. 3 with the collar assemblies removed.
Figure 5:
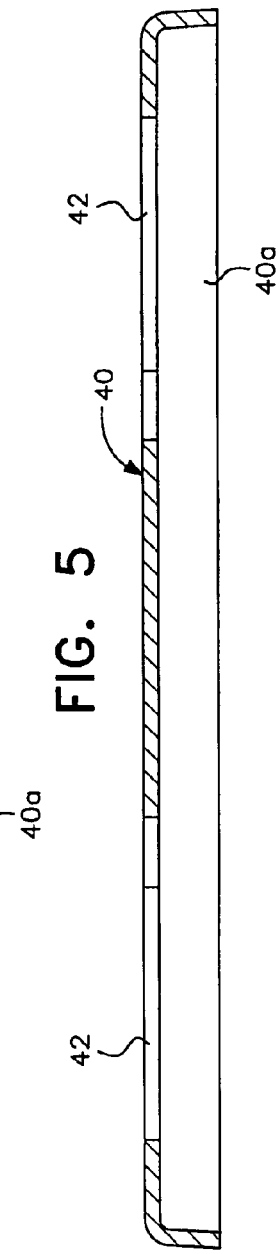
FIG. 5 is a cross-sectional view taken along lines 5—5 of FIG. 3, with the collar assemblies removed.

Referring now to the drawings in general, and particularly to FIGS. 1 and 2, a conventional seat back of a vehicle seat is shown in dotted lines at 20, with one common form of headrest being shown at 25 secured by a pair of spaced rods 26, 28 slidably and removably engaged in openings 22 in the top portion of the seat back 20 for vertical adjustment of the headrest to accommodate drivers and passengers of different heights.

The nature of the vehicle seat itself, the headrest or the mechanism for vertically adjusting the headrest relative to the seat back is not part of the instant inventive concepts. For all intents and purposes, however, substantially every front vehicle seat currently marketed carries a vertically adjustable headrest normally supported by a pair of spaced rods such as shown in FIGS. 1 and 2. A latch of some sort (not shown) enables the headrest to be fixed in a vertically-adjusted position and totally removed from the seat back in a well known manner. This invention takes advantage of this relatively universal headrest attaching construction to provide a unique monitor supporting system.

A bracket assembly according to this invention is designated generally by the reference numeral 30 in FIG. 1 and is shown as carrying a video monitor 35 for illustrative purposes. The nature of the monitor 35 is also not a part of the instant inventive concepts. As noted above, video monitors can be used for a variety of purposes. The video input can be integral with the monitor, can be fed from a separate DVD or tape player secured under the seat or elsewhere, and can even be received from a computer or the like. Similarly, the power source for the monitor is not a part of the instant inventive concepts and could be battery of any sort, including the vehicle battery. Commonly, however, such video monitors have a threaded aperture in their base (not shown) which may be used to mount the same on the bracket assembly 30 as discussed below.

According to the preferred embodiment of the instant inventive concepts, the bracket assembly 30 seen best in FIGS. 3–6, comprises a base member 40 which can be formed of metal, plastic or the like, a pair of collar assemblies 45 and a monitor mounting element 50 secured to the base member 40 by a universal joint assembly 55.

The base member 40 preferably has a depending peripheral flange 40a and includes a pair of spaced, elongated grooves 42, each of which slidingly receives a collar assembly 45 in a manner to be discussed in more detail hereinafter. Further, a plurality of openings 44 are provided to receive threaded set screws or the like (not shown) to attach the universal joint assembly 55 to the base member 40.

Preferably, each of the collar assemblies 45 is movable in its respective groove 42 to accommodate different spacing between rods of vehicle headrests by different vehicle manufacturers, although for practical purposes, only one of the collar assemblies 45 needs to be movable to accommodate such spacing differences. Each collar assembly as shown include a bolt member 60 having a central through-opening 62 adapted to slidingly receive a rod 26 of the headrest 25. An enlarged head 64 of the bolt member 60 underlies the base member 40 and the shaft or extension 66 passes through its associated groove 42 and has external threads thereon.

A separate nut member 68 can be provided to threadably engage the shaft 66 to secure the bolt member 60 in a fixed position along the length of its respective groove 42. Again, only one collar assembly 45 needs to be lockable in a specific position in its respective groove 42, even if both collar assemblies 45 are movable, since fixing the position of one collar assembly will, in combination with the headrest rod spacing, automatically locate the other collar assembly in its groove. Alternatively, or additionally, a lock nut or cap 70 may be provided which will accomplish the same purpose and, additionally, interact with a resilient annular element or bushing 72 to grippingly secure the collar assembly 45 in a selected vertical position along the length of its associated headrest rod 26.

Figure 6:
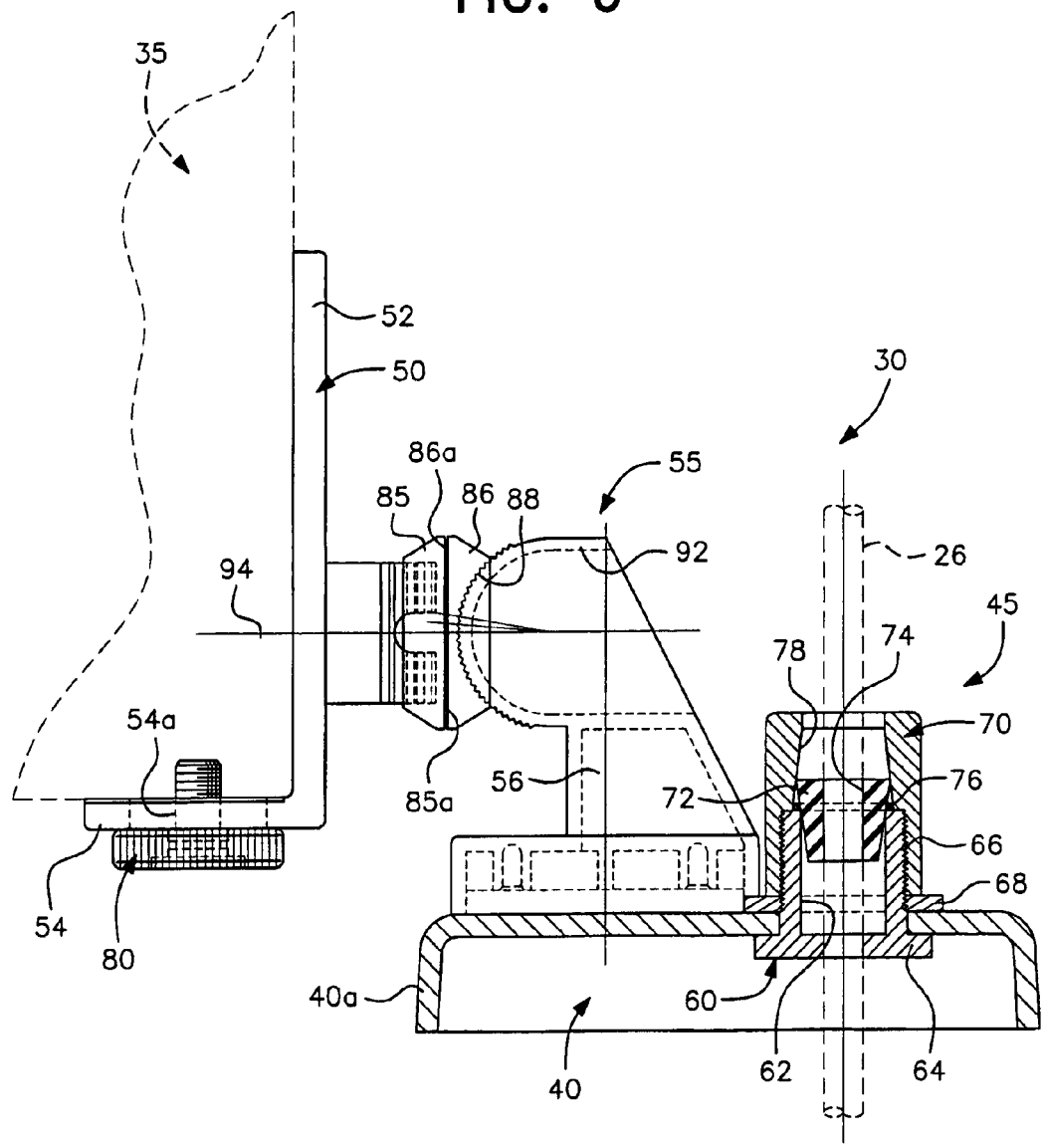
FIG. 6 is a cross-sectional view taken along lines 6—6 of FIG. 3, with the monitor mounting element secured to the base member by a universal joint, portions of a vehicle seat headrest rod and a monitor being shown in dotted lines.
Figure 7:
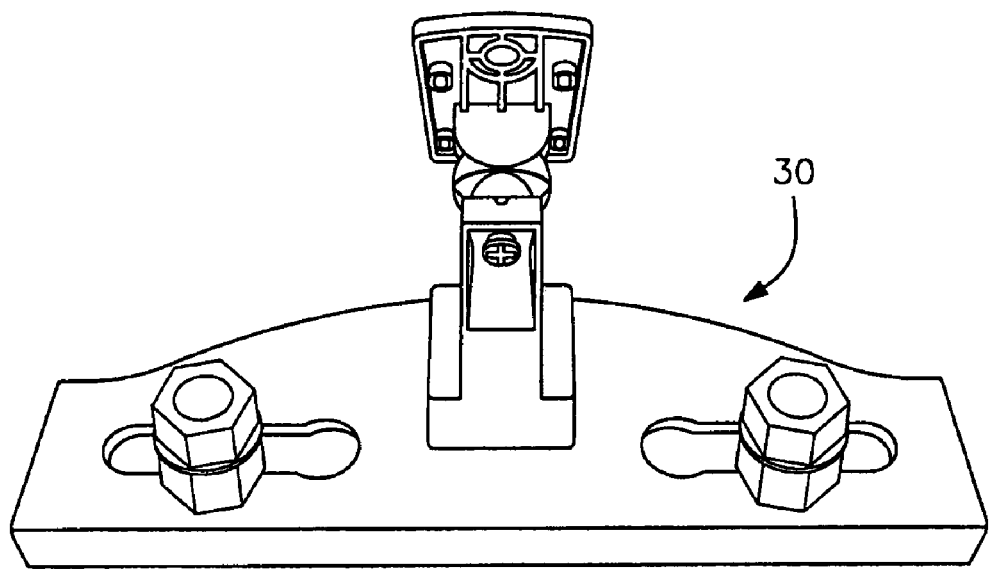
FIGS. 7–9 are perspective views of the bracket assembly of this invention seen from different angles.
Figure 8:
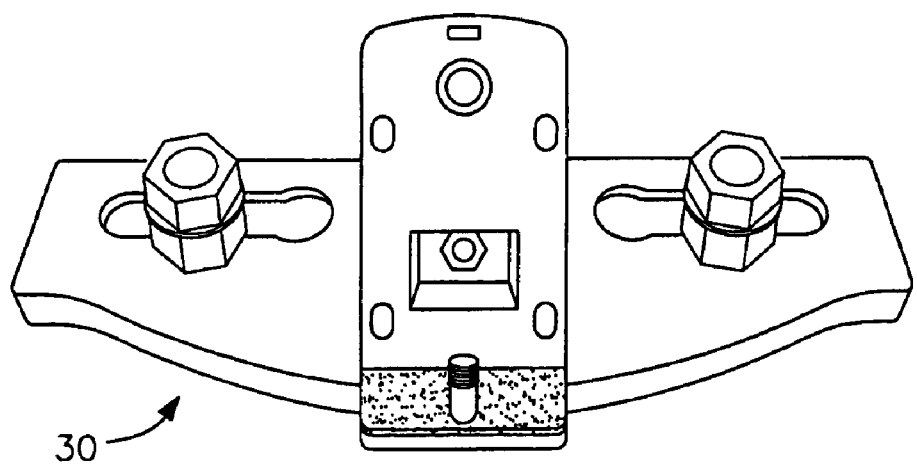
Figure 9:
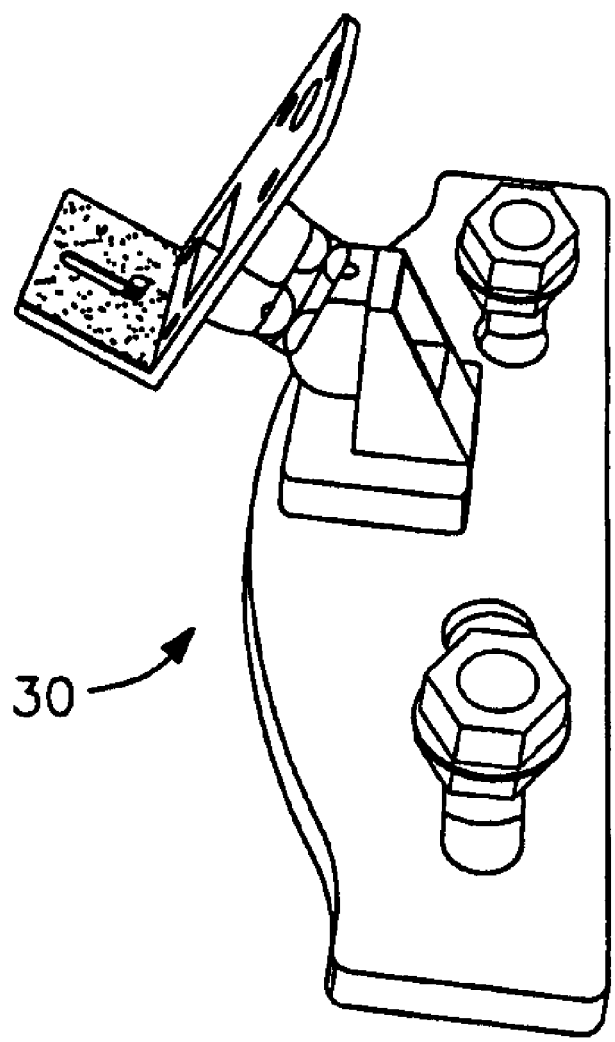

As seen in FIG. 6, the bushing 72, which may be made of a resilient plastic or rubber material, has an internal opening 74 of generally constant cross-section, with a tapered wall 76 adapted to be squeezed inwardly by the angled portion 78 of the lock nut 70 to reduce the diameter of the bore 74 to grip headrest rods of different cross-section, for example, rods from 9 mm to 13 mm which is used by various automobile manufacturers.

The monitor mounting element 50 is generally L-shaped and has a vertically extending backing portion 52 and an integral, generally horizontally extending, shelf portion 54 with an aperture 54a therethrough to receive a thumbscrew 80 for engagement with the threaded opening in the base of a monitor 35 as discussed above. This arrangement will permit securely supporting monitors with a variety of screen sizes on the generally L-shaped monitor mounting element 50.

The universal joint assembly 55 is designed to enable the viewing angle of the monitor 35 carried by the mounting element 50 to be adjusted about both vertical and horizontal axes. The details of the universal joint assembly 55 are not critical to the instant inventive concepts and any means to enable the monitor screen to be adjusted side-to-side and up-and-down will function effectively in the bracket assembly of this invention.

The embodiment of the universal joint assembly 55 illustrated in FIG. 6 includes a pair of elements 85, 86 having ridged mating surfaces 85a, 86a. The element 85 is attached to the backing portion of the mounting element 50, and the element 86 has a concave surface 88, which mates with a convex surface 90 on the universal joint supporting member 56 attached to the base member 40. A screw and nut assembly (not shown) passes along the axis 94, through the elements 85, 86, through an elongated slot (not shown) in the element 88 and ultimately through the element 90 to lock the elements in a selected adjusted angular relationship. When loosened, the screw defines the axis 94 enabling the viewing angle of the monitor screen to be adjusted side-to-side about the surfaces 85a, 86a, with the surface 88 on the element 86 being slid along the convex surface 90 guided by the screw to adjust the vertical relationship of the viewing angle of the monitor screen.

The use and operation of the bracket assembly of this invention will now be obvious to the skilled artisan. The factory headrest is removed from the seat back and the rods of the headrest are slid through the openings in the collar assemblies 45, at least one of which can be adjusted side-to-side along the grooves 42 to accommodate different spacings between the rods. The rods are then reinserted into the upper portion of the seat back in a conventional manner. The collar assemblies can then be locked in place, both side-to-side in the grooves 42 and vertically on the rods 26 as described above.

A video monitor can be fixed to the L-shaped mounting element 52 by the thumb screw 80 and the monitor adjusted via the universal joint assembly 55 to present a desired viewing angle to a passenger in the rear seat. The video monitor can be readily removed from the bracket assembly for storage or use in another location. The bracket assembly itself can be retained permanently on the headrest rods or can be readily removed for storage or use in another vehicle, if desired.

It will now be seen that this application discloses a bracket assembly for a video monitor to be used in a vehicle which satisfies all of the foregoing objects, and others, providing many advantages of great practical utility and commercial importance. The foregoing descriptions and drawings should be considered as illustrative only of the principles of the invention. Numerous applications of the present invention will readily occur to those skilled in the art. Therefore, it is not desired to limit the invention to the preferred embodiments or the exact construction and operation shown and described. Rather, all suitable modifications and equivalents may be resorted to, falling within the scope of the invention.

What is claimed is:

1. A bracket assembly for supporting a video monitor behind a vehicle seat wherein the vehicle seat includes a seat back with a top portion, a headrest, and a pair of spaced rods supporting the headrest and secured in the top portion of the seat back, said bracket assembly comprising a base member, a pair of rod-receiving collar assemblies carried by said base member and defining openings adapted to slidingly receive the rods of the vehicle seat headrest, a monitor mounting element carried by said base member, and means for securing a monitor to said mounting element, said base member including portions defining at least one elongated groove, at least one of said collar assemblies being slidingly supported in said groove for movement relative to the other of said collar assemblies to accommodate different spacing between the rods of the vehicle seat headrest, said one collar assembly including securing means adapted to selectively fix said one collar assembly against sliding movement in said groove, said one collar assembly comprising a bolt member having a central through-opening adapted to slidingly receive a rod, said bolt member including an enlarged head adapted to seat on one side of said base member and a shaft adapted to pass through said groove and having a terminal end portion, and a nut member adapted to threadably engage said shaft on the other side of said base member to secure said one collar assembly in a fixed position in said groove, said one collar assembly further including locking means adapted to grippingly engage a rod passing through said through-opening of said bolt member to fix said one collar assembly at a selected position along the rod, said locking means including a resilient bushing positioned in said opening in said terminal portion of said extension of said bolt member, and a lock nut threadably securable on said shaft adapted to squeeze said bushing as it is threaded onto said shaft to grip a rod passing therethrough.

2. The bracket assembly of claim 1 further including means to adjust the diameter of said opening in said one collar assembly to accommodate rods of different cross-section.

3. The bracket assembly of claim 2 wherein said bushing has an internal opening of generally constant cross-section and a wall portion of tapering thickness defining said internal opening, the cross-section of said internal opening in said bushing being reduced as said lock nut is threaded onto said shaft.

4. The bracket assembly of claim 1, wherein said base member includes portions defining a pair of spaced elongated grooves, each collar assembly being slidingly supported in one of said grooves, and securing means to fix at least one of said collar assemblies at a selected position in its respective groove.

5. The bracket assembly of claim 1 further including a universal joint assembly connecting said monitor mounting element to said base member to enable the viewing angle of a screen on a monitor carried thereby to be universally adjusted.

6. The bracket assembly of claim 1 wherein said monitor mounting element is generally L-shaped and includes a shelf portion to support a monitor, an aperture defined through said shelf portion, and a thumbscrew having a head underlying said shelf portion and a threaded shaft extending through said aperture adapted to engage a complementary threaded opening in the base of a monitor.

7. In combination, a vehicle seat wherein the vehicle seat including a seat back with a top portion, a headrest, and a pair of spaced rods supporting the headrest and secured in the top portion of the seat back, and a bracket assembly supporting a video monitor behind said vehicle seat, said bracket assembly comprising a base member, a pair of rod-receiving collar assemblies carried by said base member and defining openings slidingly receiving said rods of said vehicle seat headrest, a monitor mounting element carried by said base member, and means for securing a monitor to said mounting elements, said base member including portions defining at least one elongated groove, at least one of said collar assemblies being slidingly supported in said groove for movement relative to the other of said collar assemblies to accommodate different spacing between said rods of said vehicle seat headrest, said one collar assembly including securing means fixing said one collar assembly against sliding movement in said groove, said one collar assembly comprising a bolt member having a central through-opening slidingly receiving a rod, said bolt member including an enlarged head seating on one side of said base member and a shaft passing through said groove and having a terminal end portion, and a nut member threadably engaging said shaft on the other side of said base member to secure said one collar assembly in a fixed position in said groove, said one collar assembly further including locking means adapted to grippingly engaging a rod passing through said through-opening of said bolt member to fix said one collar assembly at a selected position along said rod, said locking means including a resilient bushing positioned in said opening in said terminal portion of said shaft of said bolt member, and a lock nut threadably secured on said shaft and squeezing said bushing to grip a rod passing therethrough.

8. The combination of claim 7 further including means to adjust the diameter of said opening in said one collar assembly to accommodate rods of different cross-section.

9. The combination of claim 8 wherein said bushing has an internal opening of generally constant cross-section and a wall portion of tapering thickness defining said internal opening, the cross-section of said internal opening in said bushing being reduced as said lock nut is threaded onto said shaft.

10. The combination of claim 7, wherein said base member includes portions defining a pair of spaced elongated grooves, each collar assembly being slidingly supported in one of said grooves, and securing means fixing at least one of said collar assemblies at a selected position in its respective groove.

11. The combination of claim 7 further including a universal joint assembly connecting said monitor mounting element to said base member to enable the viewing angle of a screen on a monitor carried thereby to be universally adjusted.

12. The combination of claim 7 wherein said monitor mounting element is generally L-shaped and includes a shelf portion to support a monitor, an aperture defined through said shelf portion, and a thumbscrew having a head underlying said shelf portion and a threaded shaft extending through said aperture adapted to engage a complementary threaded opening in the base of a monitor.

13. The combination of claim 7 further including a monitor threadably mounted on said mounting element.

* * * * *